United States Patent [19]

Suga et al.

[11] Patent Number: 5,438,459
[45] Date of Patent: Aug. 1, 1995

[54] METHOD OF PROCESSING AND RECORDING DATA WHILE REPRODUCING THE SAME AND APPARATUS FOR THE METHOD

[75] Inventors: Atsuo Suga, Kamagaya; Shigemitsu Higuchi, Fujisawa; Hideo Nishijima; Hiromasa Fujii, both of Katsuta, all of Japan

[73] Assignee: Hitachi, Ltd., Tokyo, Japan

[21] Appl. No.: 876,083

[22] Filed: Apr. 30, 1992

[30] Foreign Application Priority Data

May 22, 1991 [JP] Japan .................................. 3-117436

[51] Int. Cl.⁶ ........................... H04N 5/78; H04N 9/79
[52] U.S. Cl. ........................... 360/38.1; 358/310; 360/27; 360/31; 360/53
[58] Field of Search ................. 360/14.3, 31, 38.1, 360/14.1, 14.2, 27, 53, 74.1, 60; 358/310, 314, 315, 327; 395/575

[56] References Cited

U.S. PATENT DOCUMENTS

| | | | |
|---|---|---|---|
| 4,389,680 | 6/1983 | Gramling | 360/14.1 |
| 4,674,076 | 6/1987 | Hsieh et al. | 369/44.28 X |
| 4,723,176 | 2/1988 | Ive | 360/31 X |
| 4,914,661 | 4/1990 | Mester | 371/40.1 |
| 4,918,694 | 4/1990 | Preissler | 371/37.4 |
| 4,939,605 | 7/1990 | Heitmann et al. | 360/14.1 |
| 4,974,111 | 11/1990 | Platte et al. | 360/14.1 |
| 5,124,851 | 6/1992 | Masui et al. | 364/53 |

FOREIGN PATENT DOCUMENTS

2122477  5/1990  Japan .

*Primary Examiner*—Andrew L. Sniezek
*Attorney, Agent, or Firm*—Antonelli, Terry, Stout & Kraus

[57] ABSTRACT

The precedingly reproduction signal reproduced by a precedingly reproducing head is recorded on a tape. If it is detected that the reproduction signal includes abnormality owing to a reason such as poor error rate, the recording operation is stopped. Then, for retrial of the recording, the information on the position where the abnormality has occurred is held. A memory may be provided to always rewrite and store the signal reproduced by the precedingly reproducing head, and also a simultaneously reproducing head which is different from the precedingly reproducing head may be provided to immediately monitor the recording state of the signal recorded on the tape. If it is detected that the signal reproduced by the simultaneously reproducing head includes abnormality, the recording operation is stopped, the information on the position where the abnormality has occurred is held. Further, the rewrite operation in the memory is stopped and the original precedingly reproduction signal corresponding to the signal to be recorded at the position where the abnormality has occurred is held in the memory.

18 Claims, 6 Drawing Sheets

METHOD OF PROCESSING AND RECORDING DATA WHILE REPRODUCING THE SAME AND APPARATUS FOR THE METHOD

BACKGROUND OF THE INVENTION

1. Field of the Invention

The present invention relates to an apparatus for recording/reproducing a digital signal.

2. Description of the Related Art

In the field of professional-use video tape recorders (VTRs), demands for high video quality have shifted a VTR system from the conventional analog signal recording system to a digital signal recording system. The current digital VTR system is classified into a type of D1 format for dealing with a component video signal and a type of D2 format for dealing with a composite video signal. These formats permit four-channel digital audio signals to be recorded as well as the video signals. These signals can be recorded on different positions on the same track and individually edited.

From the feature of the above formats a digital audio signal can easily be edited among different channels using a single VTR. For example, such a VTR of a D1 format as disclosed in Hoso Gijutsu (Broadcasting Technology) Showa 61.11 (1986) pp. 72 to 76 has a digital audio precedingly reproducing head dedicatedly provided on a cylinder and can edit a digital signal among different channels with no signal delay. A precedingly reproduced signal can be used to realize various functions as well as the edition of audio signal. For example, a video signal precedingly reproduced from a VTR can be supplied to the same VTR to be recorded again after passed through an external device such as an effector. In a VTR in which video and audio signals are mixed and processed to provide a recording signal, part of the precedingly reproduced signal is rewritten and recorded.

When these functions are executed to record again the signal reproduced from a tape using the precedingly reproduced signal, the original signal recorded on the tape will be lost. This means that retrial is not permitted. These functions, therefore, must be executed very carefully. However, even when the greatest care is paid in executing these functions, as the case may be, the edition ends in failure because of inevitable causes such as the bad condition of the apparatus. This is a reason why these functions cannot be used with security. In order to obviate such difficulty, some mechanism for protecting the failure as well as means for executing these functions must be prepared.

SUMMARY OF THE INVENTION

An object of the present invention is to provide a digital signal recording/reproducing apparatus in which the function of reproducing a signal previously recorded on a recording medium using a precedingly reproducing head and recording it again after processing of the signal can be achieved and retrial is allowed when executing this function ends in failure.

In order to attain the above object, a recording/reproducing apparatus according to the present invention includes a medium driving unit for driving a recording medium; a reproducing unit having a reproducing head for reproducing data recorded on the recording medium to be outputted as an output data and for generating an error occurrence signal when a predetermined error condition occurs during the reproducing operation of reproducing the recorded data; a recording unit having a recording head for generating a record data on the basis of input data corresponding to the output data with a predetermined delay time during the reproducing operation, recording the data using the recording head as a new data and stopping the recording operation in response to an input recording control signal, the reproducing head being arranged to precede the recording head by a predetermined time with respect to the recording medium; and a control unit for controlling the medium driving unit and generating the recording control signal in response to the error occurrence signal supplied from the reproducing unit so as to be supplied to the recording medium.

The data outputted from the reproducing unit may be subjected to a desired processing to supply the processed data to the recording unit as the input data.

In accordance with the present invention, in a digital video/audio signal recording/reproducing apparatus in which the signal reproduced by a precedingly reproducing head which scans the tape precedently to a recording head is recorded on the same tape position as that of the reproduction signal, if an uncorrectable error occurs in the precedingly reproduced signal during a recording operation, the position where the error has occurred is detected to stop the recording so that abnormal recording is prevented and retrial of the recording can be easily made. Further, if the uncorrectable error occurs in the signal reproduced by a simultaneously reproducing head which scans the tape position just after the recording head and immediately reproduces the recorded signal during the recording operation, a memory is provided to store the precedingly reproduced signal which leads to the signal containing the error, thereby permitting the recording to be executed again.

The above and other objects and features of the present invention will be more apparent from the following description in conjunction with the accompanying drawings.

BRIEF DESCRIPTION OF THE DRAWINGS

FIGS. 6 parts (A-G) are timing charts of signals for explaining the operation of the recording/reproducing apparatus according to the present invention;

FIG. 9 parts (A-H) are timing charts of signals for explaining the recording operation in the above modification of the present invention; and FIG. 10 parts (A-H) are timing charts of signals when retrial of the recording is performed.

DESCRIPTION OF THE PREFERRED EMBODIMENTS

Now referring to the accompanying drawings, a detailed explanation will be given of the digital data recording/reproducing apparatus according to the present invention.

Figure 1:
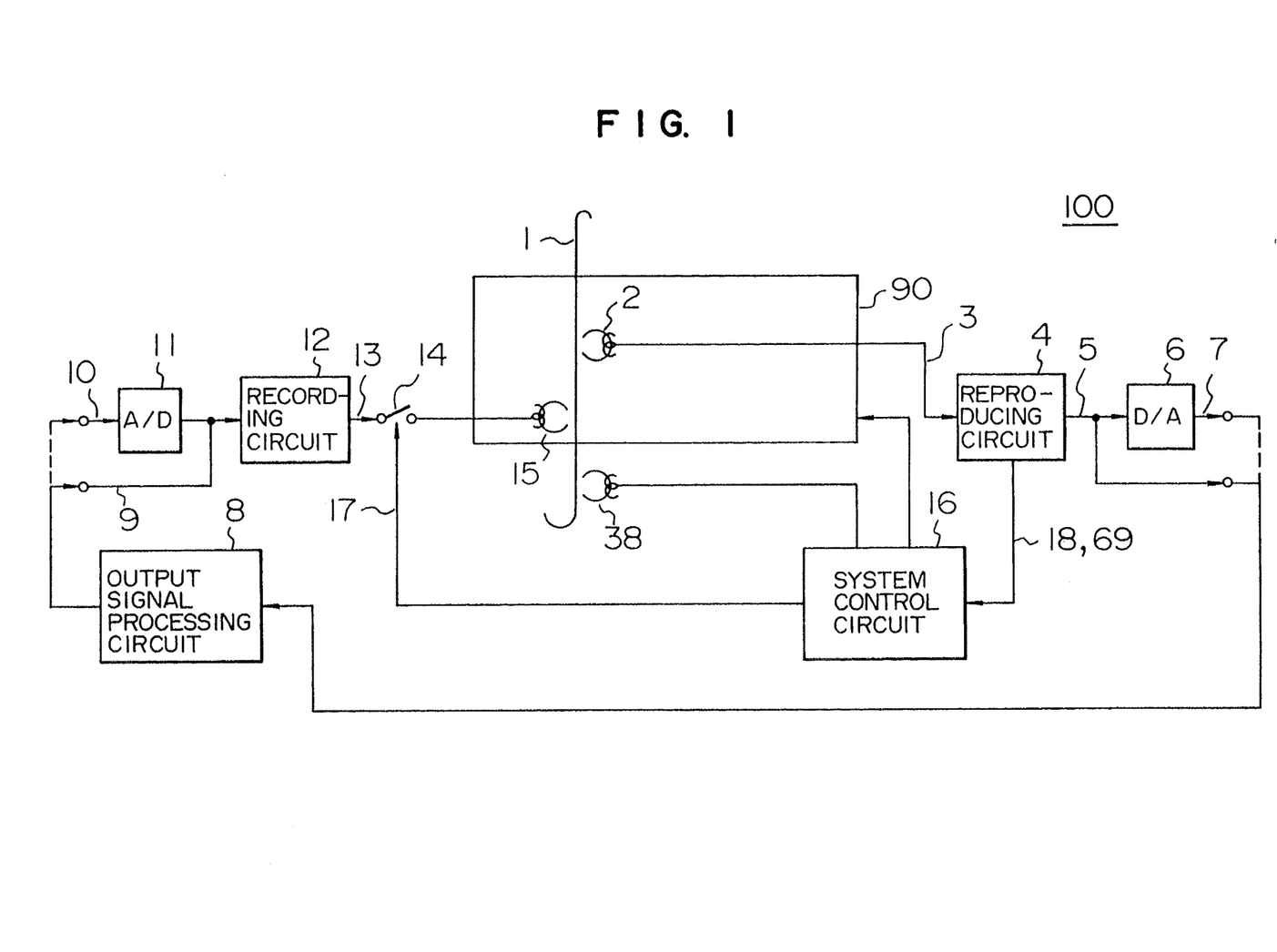
FIG. 1 is a schematic block diagram of the recording/reproducing apparatus according to the present invention.

FIG. 1 shows a block diagram of an apparatus 100 for recording/reproducing a digital/audio video signal according to one embodiment of the present invention.

As seen from FIG. 1, the recording/reproducing apparatus 100 includes a precedingly reproducing head 2, a reproducing circuit 4, and a D/A converter 6. The data recorded on a tape 1 is reproduced by the reproducing head 2 as a reproduction signal 3 which is then processed by the reproduction circuit 4 to provide a digital output signal 5. The signal 5 is converted into an analog signal 7 by the D/A converter.

The apparatus 100 also includes an output signal processing circuit 8 which processes the signal 5 or 7 to generate a digital input signal 9 or an analog input signal 10. Specifically, the processing circuit 8, if the signal 5 or 7 is an audio signal, performs an equalizing processing of changing its frequency characteristic, a mixing processing of synthesizing plural signals, etc., and, if it is a video signal, serves as a video effector, a video switcher for performing a signal processing together with an external signal. The processing circuit 8 may be arranged outside the apparatus 100.

The apparatus 100 further includes an A/D converter 11, a recording circuit 12, a recording gate 14, and a recording head 15. The A/D converter 11 converts the analog input signal 10 into the digital input signal 9. The recording circuit 12 processes the signal 9 to be converted into a record signal 13. When the recording gate 14 closes, the record signal 13 is supplied to the recording head 15. As a result, the record signal is recorded on the tape 1 as a record data. Additionally, the apparatus 100 also includes a system control circuit 16, a tape driving section 90, and a time code head 38. The opening/closing of the recording gate 14 is controlled in accordance with a recording gate control signal 17 which is generated by the control circuit 16 inside the apparatus 100.

A signal 18 representative of error information notices the control circuit 16 if any error has occurred while the reproduction signal 3 is processed by the reproducing circuit 4. In the recording system in which the record signal 13 is generated using the signal reproduced from the tape 1 by the reproducing head 2 and recorded again on the tape 1 by the recording head 15, the control circuit 16 controls the opening/closing of the recording gate 14 in accordance with the control signal 17 using the error information signal 18. The control circuit 16 also serves to control the entire apparatus 100. The above operation is one of the functions of the control circuit 16.

Figure 2A:
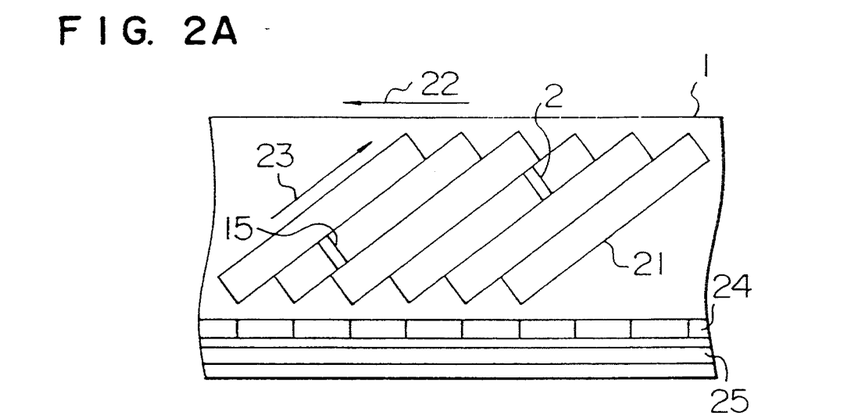
FIGS. 2A and 2B are views showing the recording pattern of data on a recording tape and the format of the recorded data, respectively.
Figure 2B:
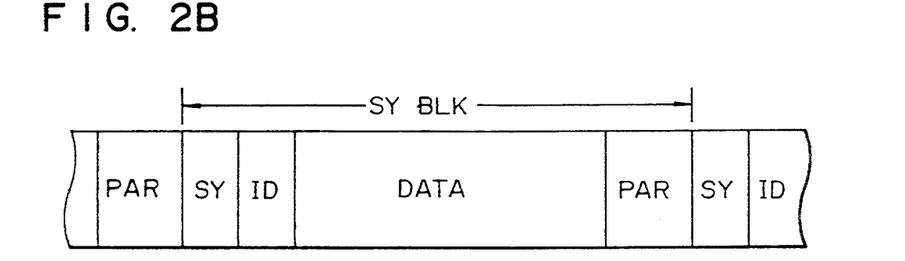

FIGS. 2A and 2B show the recording pattern on the tape 1 and the format of recorded data, respectively. During recording, the recording heads records a signal on tracks 21 of the tape 1 whereas during reproducing, the reproducing head 2 reproduces a signal from the tracks 21. One field of the video-signal is composed of 10 tracks in case of a D1 format of the digital VTR or 6 tracks in case of a D2 format of the digital VTR. It is assumed in the illustrated example that 3 tracks constitute one field of the video signal.

The tape 1 further includes a control track 24 and a time code track 25 which will be described later. The format of the record data is a collection of sync blocks SYBLKs each composed of a sync data SY, an identification data ID, a digital data DATA and a parity PAR.

Figure 3:
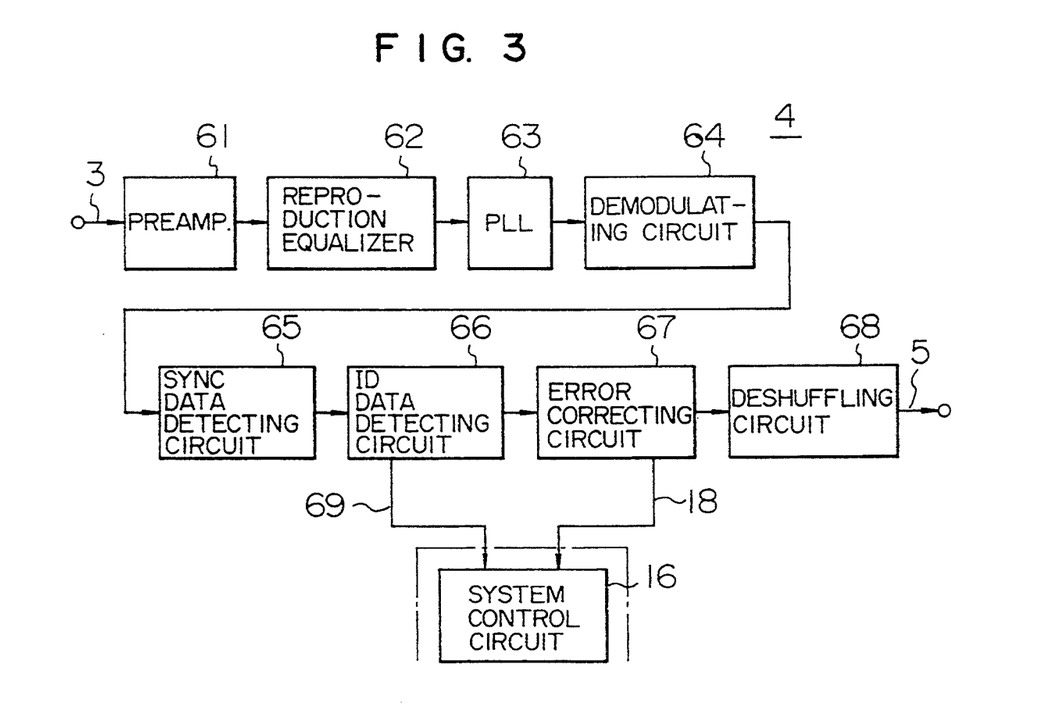
FIG. 3 is a block diagram of the reproduced signal processing section.

FIG. 3 shows a block diagram of an arrangement of the reproducing circuit 4. The reproducing circuit 4 includes a preamplifier 61, a reproduction equalizer 62, a phase-locked loop (PLL) 63, a demodulation circuit 64, a sync data detecting circuit 65, an ID data detecting circuit 66, an error correcting circuit 67 and a deshuffling circuit 68. The preamplifier 61 amplifies the reproduction signal 3 sent from the precedingly reproducing head 2; the equalizer 62 corrects the frequency characteristic of the reproduction signal deteriorated during the magnetic recording/reproducing process; and the PLL 63 generates a clock signal synchronous with the level transition timing of the reproduction signal 3. The demodulating circuit 64 demodulates a data array modulated by a modulating circuit 56 in the record signal processing system described later into an original data array. The detecting circuit 65 detects a signal representing the sync data SY to recognize the pause between the sync blocks SYBLKs each of which serves as a unit of error detection and error correction so that a serial signal is converted into a 8-bit parallel signal. The detecting circuit 66 detects a signal representing the identification data ID. The identification data signal ID 69 includes field information representative of its history and track information. The data signal ID 69, together with a time code signal described later, is supplied to the control circuit 16 and used to obtain position information of a signal to be recorded/reproduced. The correcting circuit 67 detects and corrects an error occurring in a signal representing the digital data DATA using the parity PAR. The error information signal 18 is sent from the correcting circuit 67 to the control circuit 16. The deshuffling circuit 68 rearranges data arranged in a shuffling circuit 51 of the record signal processing system.

Figure 4:
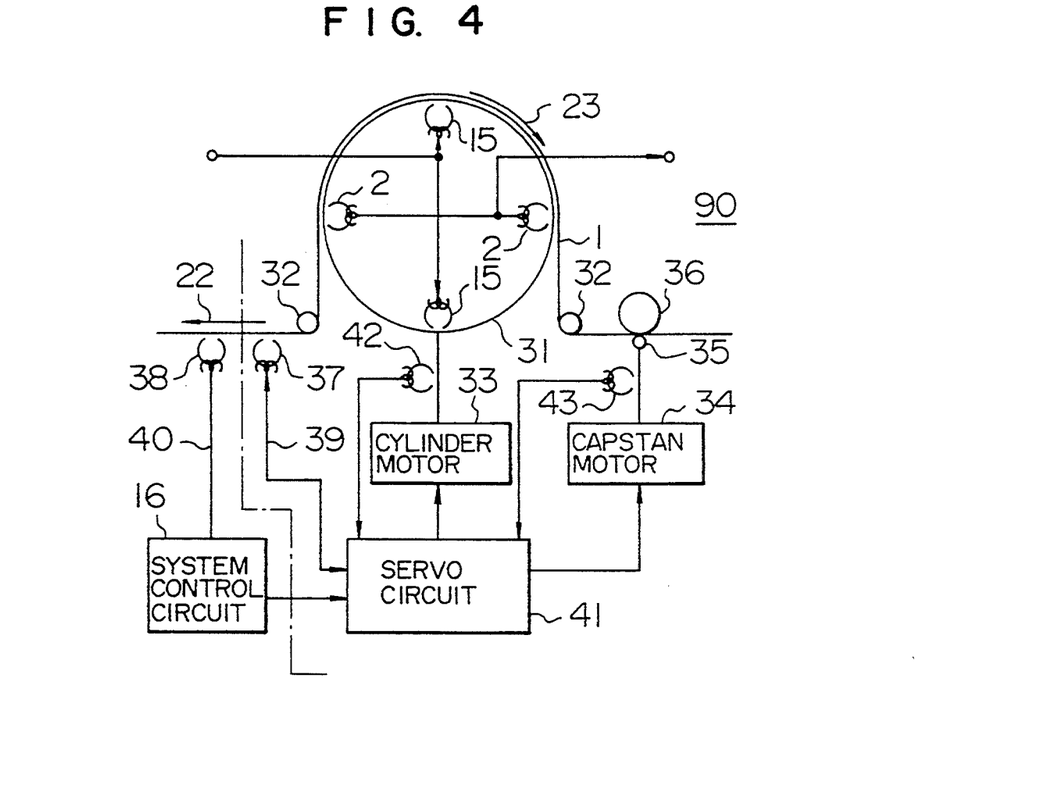
FIG. 4 is a block diagram of a tape driving section.

FIG. 4 shows a block diagram of the tape driving section 90 for controlling the running of the tape 1.

The section 90 includes a cylinder 31, a guide 32, and cylinder motor 33 for driving the cylinder 31. The guide 32 winds the tape 1 on the cylinder 31 by about 180°. The cylinder 31 is provided with two precedingly-reproducing heads 2 and two recording heads 15. These heads access the tape 1 in its oblique direction when the cylinder motor 33 rotates. As seen from FIG. 2A, the reproducing head 2 accesses the tracks 21 precedingly to the recording head 15 by a time period corresponding to two and half tracks.

The section 90 also includes a capstan motor 34, a capstan 35, and a pinch-roller 36. The capstan motor 34 serves to rotate the capstan 35. The rotating capstan 35 and pinch-roller sandwiches the tape 1 to run it.

The section 90 further includes a control head 37, a time code head 38, a servo circuit 41, a cylinder pulse generator 42, and a capstan frequency generator 43. The servo circuit 41 controls the running of the tape in accordance with a reference signal which is generated inside itself or externally supplied. It is assumed in the illustrated example that the reference signal is generated inside of the servo circuit 41. The servo circuit 41 controls the cylinder 31 so that the pulse generated by the generator 42 is synchronous with the reference signal. The control head 37 records or reproduces a control signal 39 on the control track 24 (FIG. 2). The control signal to be recorded on the track 24 is generated in synchronism with the reference signal in its recording. In the illustrated example, it is assumed that a single pulse of the control signal 39 is generated by each half rotation of the cylinder 31.

In reproducing the control signal, generally, the servo circuit 41 controls the rotation of the capstan motor 34 so that the control signal 39 is in synchronism with the reference signal. Further, the servo circuit 41 detects the output from the generator 43 for generating a signal having the frequency proportional to the rotation number of the capstan 35 and controls the capstan motor 34 so that the above frequency is the frequency corresponding to a speed command from the control circuit 16.

The time code head 38 records or reproduces a time code signal 40 on the time code track 25. The time code signal 40 represents the position information of the signal recorded on the track 21 and is used to specify operating points in retrieval and edition. The control circuit 16 reads the time code signal 40 in reproduction to detect the position information. The minimum unit for the time code signal 40 is a frame time.

Figure 5:
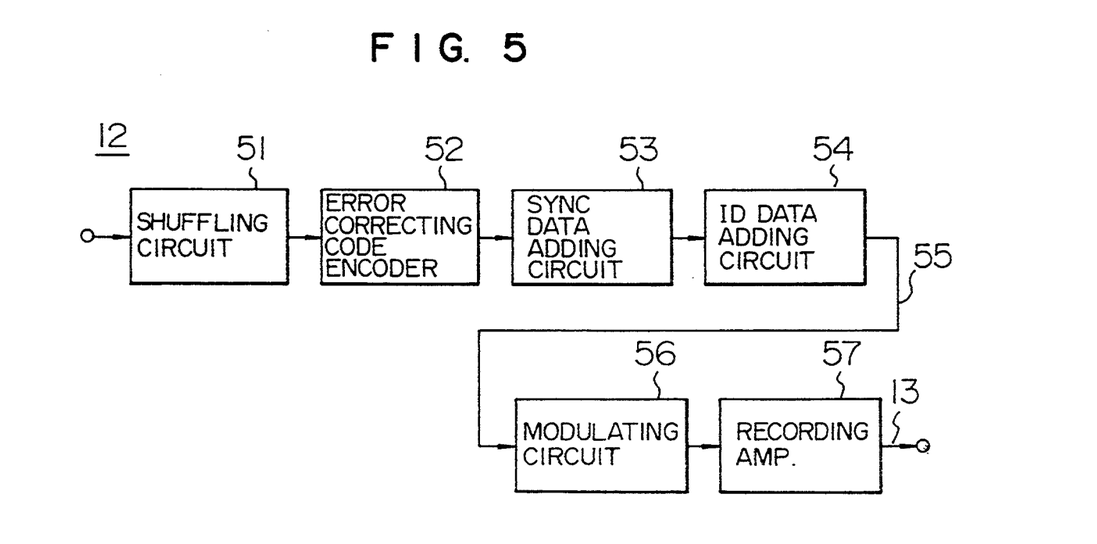
FIG. 5 is a block diagram of the recorded signal processing section.

FIG. 5 shows a block diagram of the recording circuit 12. As seen from FIG. 5, the circuit 12 includes a shuffling circuit 51, an error correcting code encoder 52, a sync data adding circuit 53, and an ID data adding circuit 54. The shuffling circuit 51 rearranges the data of the digital audio/video input signal 9 (FIG. 1) for each track. Thus, lack in the signal at a part of the track 21 does not lead to continuous lack in the data, but deterioration of the output signal can be prevented by the technique such as signal interpolation processing in the reproduction.

As understood from the data format of FIG. 2B, the error correcting code encoder 52 adds a parity PAR to the above rearranged digital data DATA, the sync data adding circuit 53 adds a sync data to the data and the ID data detecting circuit 54 adds an identification data ID to the data. The parity PAR is generated in accordance with the rearranged digital data DATA along the processing algorithm in the correcting code encoder 52. The parity PAR is used to detect and correct the error included in the reproduced data. The identification data ID represents the address information on the digital data DATA and is used to restore the arrangement of data to that before rearrangement. The identification data ID includes also the field information representative of the history of the data and track information. The sync data SY is a data pattern representative of a pause between the sync data blocks SYBLKs. Detection of the sync data SY is accompanied by recognition of the sync data blocks SYBLK. Thus, the error detection/correction is performed for each data digital data DATA included in the sync data block.

The recording circuit 12 further includes a modulating circuit 56 and a recording amplifier 57. The modulating circuit 56 converts a record data signal 55 into a data array having the frequency spectrum characteristic which permits the data to be transferred to the recording heads 15 attached to the rotating cylinder 31.

Figure 6:
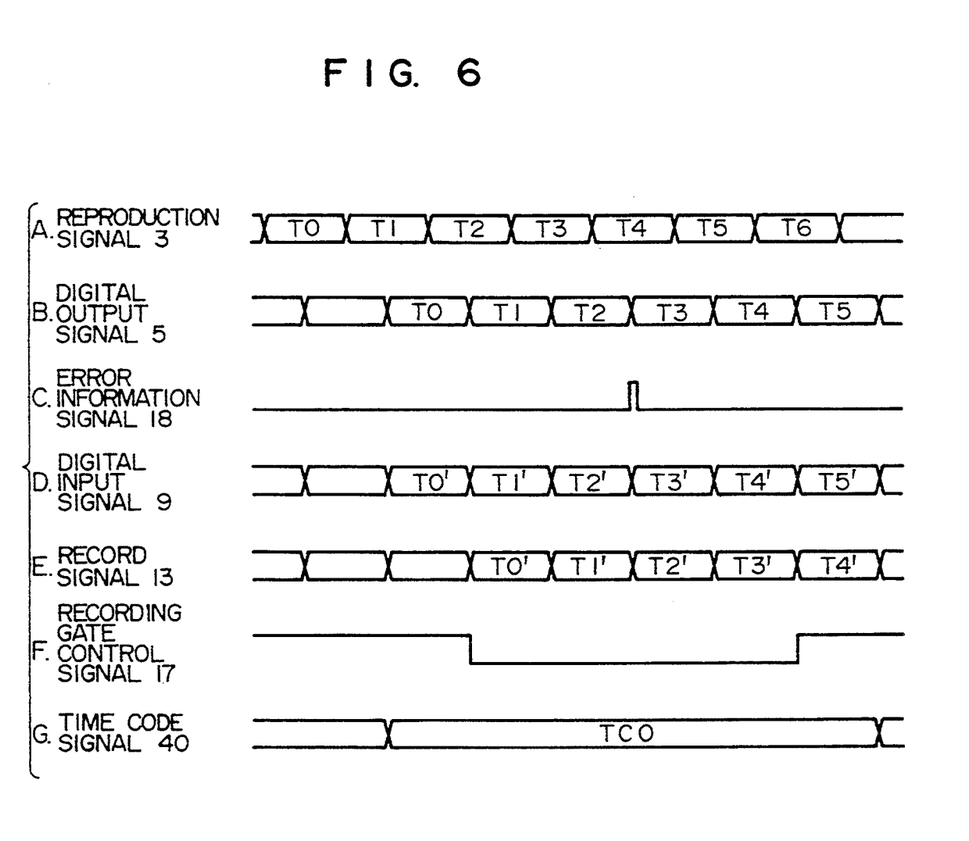

Now referring to FIGS. 6A to 6G, an explanation will be given of the operation of the recording/reproducing apparatus 100 according to one embodiment of the present invention. FIGS. 6A, 6B, 6C, 6D, 6E, 6F and 6G show timing relationships of the reproduction signal 3, the digital output signal 5, the error information signal 18, the digital input signal 9, the record signal 13, the recording gate control signal 17 and the time code signal 40, respectively. The pause in each of the reproduction signal 3, the output signal 5, the input signal 9 and the record signal 13 in FIGS. 6A, 6B, 6D and 6E corresponds to the signal for each of the tracks 21. Specifically, T0 to T6 of the reproduction signal 3 are signal components reproduced from successive seven tracks 21 on the tape 1. T0' to T5' of the input signal 9 are signal components resulting when T0 to T5 of the output signal 5 are processed by the processing circuit 8. The pause in the time code signal 40 corresponds to one frame. Namely, T0 to T5 of the output signal 5 which are produced in synchronism with TC0 belongs to the TC0-corresponding frame of the time code signal 40. The error information signal 18 shifts from Low to High in its digital level when an uncorrectable error is detected in the reproduction signal 3. The control signal 17' controls recording gate 14 in such a manner that when the control signal 17 is Low, the recording gate 14 is closed, thereby recording data. The recording gate 14 may be controlled under several conditions including the above condition where an uncorrectable error occurs. For example, the recording may be stopped only if the error is so critical that it cannot be sufficiently corrected.

Now, it is assumed that the successive tracks 21 are previously formed on the tape 1. After the precedingly reproducing head 2 reproduces the signal recorded on these tracks 21, a new signal is generated on the basis of the reproduced signal The recording head 15 records the new signal on the same position as the track 21 precedingly reproduced. Since such a recording manner intends only to rewrite the tracks 21, the control track 24 and time code track 24 are in the reproduction! state. It is assumed that the signal components of the tracks 21 recorded on the tape 1 are rewritten starting from T0. This means that the tracks 21 corresponding to TC0 in the time code signal 40 are rewritten successively.

Since the shuffling circuit 51 rearranges the reproduction signal 3 for each data contained in one track, the reproducing circuit 4 generates the output signal 5 after at least one track time delay. Almost no time delay occurs in the process of generating the input signal 9 on the basis of the output signal 5. The recording circuit 12 requires at least one track time delay for the same reason as that relative to the reproducing circuit 4. The condition of executing the above recording method at correct timings is that since the reproducing head 2 scans the tracks 21 precedingly to the recording head 15 by two and half tracks, the reproduction signal 3 precedes the record signal by the same amount. The control signal 17 shifts to Low at T' of the record signal 13, thus initiating the recording.

Now, it is assumed that an uncorrectable error has been detected in the reproduction signal 3 during the recording. Namely, as seen from FIGS. 6A and 6C, the error is detected at T4 of the reproduction signal, and the error information signal 18 shifts to High at the corresponding timing. In response to the error information signal 18, the control circuit 16 shifts the control signal 17 to High before T4' of the record signal 13 is generated, thereby stopping the recording. Thus, it is possible to prevent the abnormal signal including some error from being recorded. In addition, since the original reproduction signal for the record signal is not lost, retrial of the recording can be made. Further, as the case may be, measures such as changing the equalizing characteristic for reproduction, cleaning the precedingly reproducing head, etc., can prevent occurrence of the error at the signal component where the error has occurred. Retrial of the recording, therefore, permits the recording with less signal attenuation. Moreover, since the position where the recording has stopped can be known from the time code signal 40 and identification signal 69 which are supplied to the control circuit 16, retrial of the recording can be easily performed without newly setting the recording position. Additionally, In order to make inspection such as cleaning the heads, the tape 1 must be removed before retrial of the recording. In this case also, the data such as the position information must be held.

Figure 7:
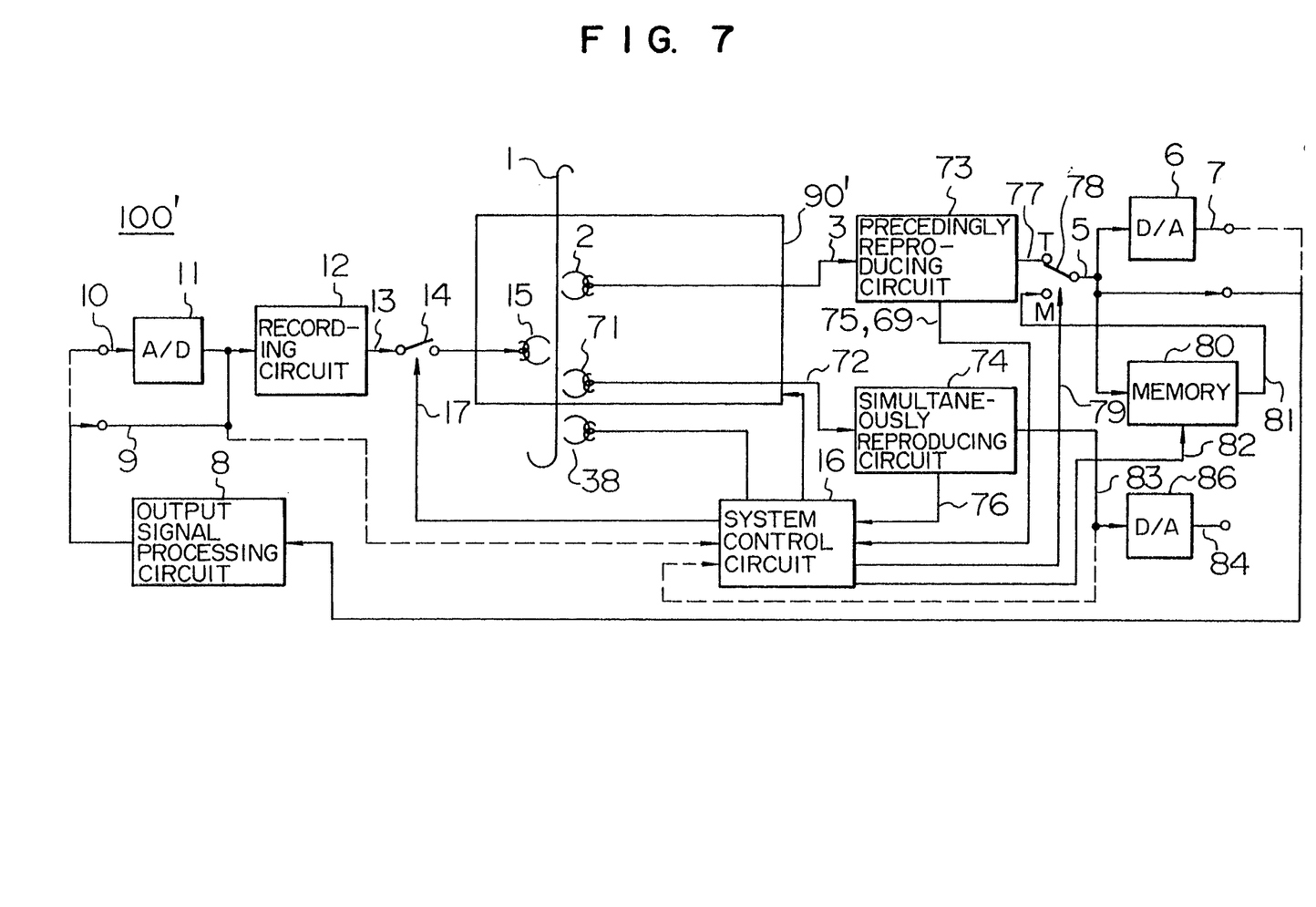
FIG. 7 is a block diagram of a modification of the recording/reproducing apparatus according to the present invention.

FIG. 7 shows a modification of the recording/reproducing apparatus according to the above embodiment of the present invention. In FIG. 7, like reference numerals refer to like parts in FIG. 1.

Figure 8:
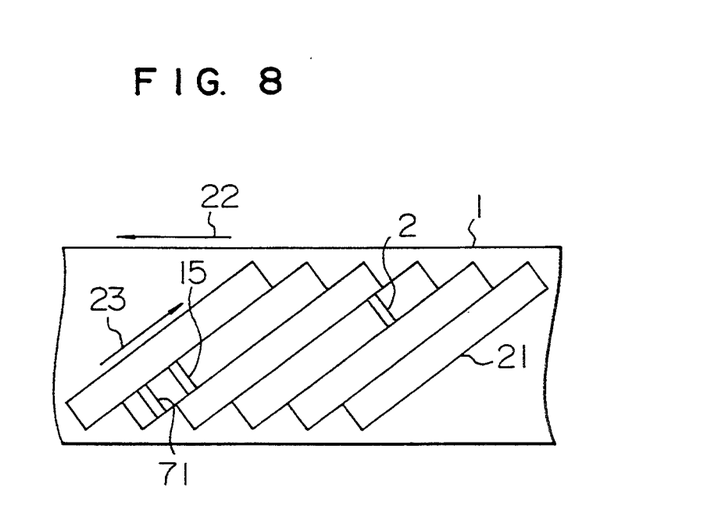
FIG. 8 is a view showing a tape pattern.
Figure 9:
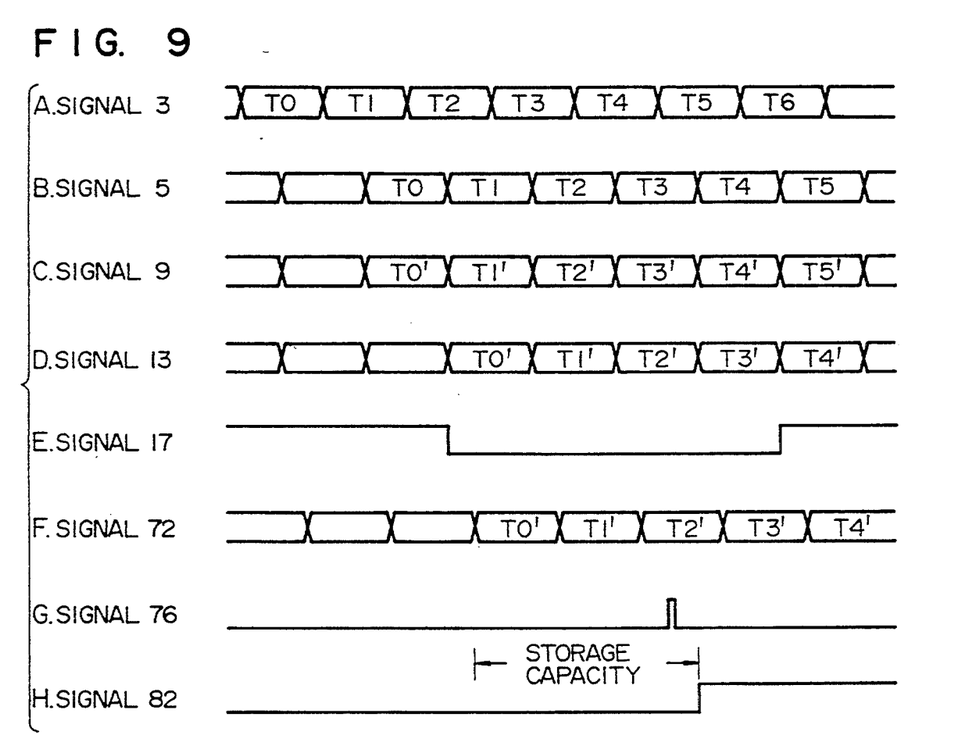
Figure 10:
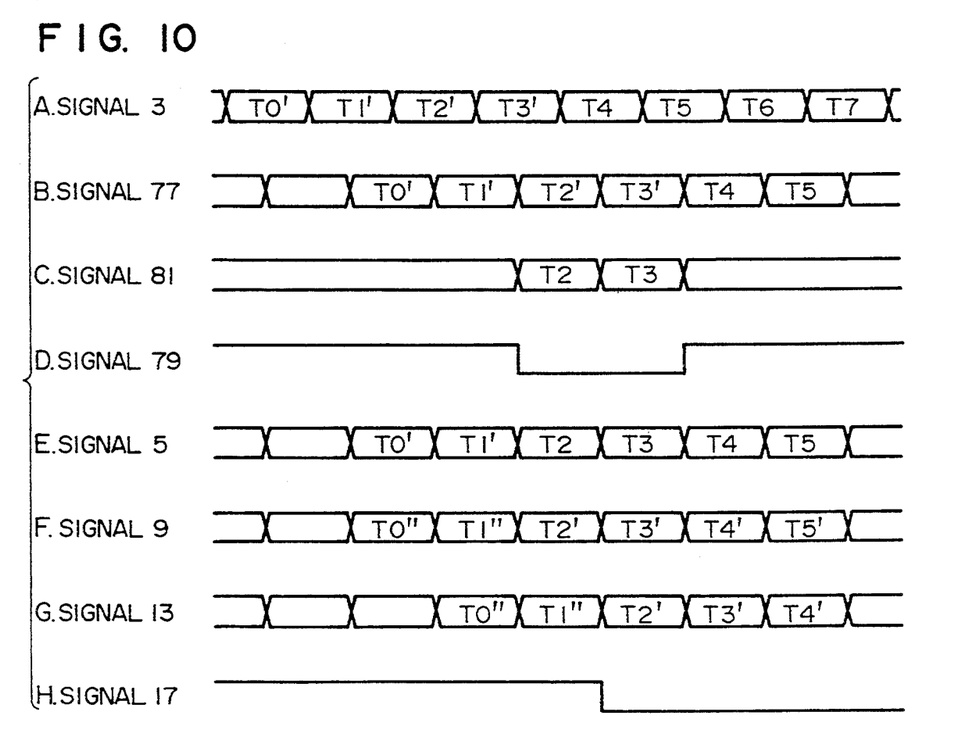

As seen from FIG. 7, an apparatus 100' includes a currently reproducing system. Specifically, the apparatus shown in FIG. 7 is mainly different from the apparatus 100 shown in FIG. 1 in that it includes, in addition to the precedingly reproducing head 15 and recording held 2, a simultaneously reproducing head 71, a simultaneously reproducing circuit 74 for processing the signal reproduced by the simultaneously reproducing head 71 and a precedingly reproducing circuit 73 for processing the signal reproduced by the precedingly reproducing head 2. The head 71 serves to reproduce the data on the tracks 21 recorded by the recording head 15. This embodiment permits retrial of the recording in the case where it is determined from the simultaneous reproduction signal from the circuit 74 that the recorded data include abnormality. FIG. 8 shows a relationship among track positions scanned by different heads 2, 15 and 71. As seen from FIG. 8, the simultaneously reproducing head 71 scans the position immediately after that scanned by the recording head 15. It should be noted that two simultaneously reproducing heads 71, like the precedingly reproducing head 2 and recording head 15, are attached to the cylinder 31. The precedingly reproducing circuit 73 and simultaneously reproducing circuit 74 in the apparatus 100' have the same arrangement as that of the reproducing circuit 4 in FIG. 1. Further, a precedingly reproduced error information signal 75 and simultaneously reproduced error information signal 76 have the same content as that of the error information signal 18 in FIG. 1, and they are supplied to the control circuit 16.

The apparatus 100' further includes a switch 78 and memory 80. When the switch 78 has been connected with the side of T by a switch control signal 79 from the control circuit 16, the output signal 77 precedingly reproduced by the circuit 73 is outputted as the digital output signal 5 from the tape 1 as in FIG. 1. Then, the output signal 5 is also supplied to and stored in the memory 80. The memory 80 can store a predetermined amount of the newest output signal 5 corresponding to its capacity in accordance with a memory control signal 82 from the control circuit 16. If the memory control signal 82 is Low, the output signal 5 can be stored in the memory 80. If the switch 78 is connected with the side of M in response to the signal 79, the signal stored in the memory 80 in response to the memory control signal 82 will be outputted as a memory output 81. If a simultaneously reproduced digital and analog output signals 83 and 84 which are outputs from the simultaneously reproducing circuit 74 and a D/A converter 84 are monitored, the recording can be made while the recording state is confirmed.

Referring to FIGS. 9A to 9H, an explanation will be given of the operation of the apparatus 100'. Since the switch 78 has been connected with the side of T, the apparatus 100' is placed in the state where the signal reproduced by the precedingly reproducing head 2 is processed by the processing circuit 8 and recorded by the recording head 15. For this reason, the timing relationship among the reproduction signal 3, digital output signal 5, digital input signal 9 and record signal 13 respectively shown in FIGS. 9A, 9B, 9C and 9D is entirely the same as that among FIGS. 6A, 6B, 6D and 6E. The recording gate control signal 17 shifts to Low at the position T0' of the record signal 13 so as to initiate recording from the position T0 of the tracks 21. The simultaneous reproduction signal 72 is reproduced at the timing slightly delayed from that of the record signal 13. Now, it is assumed that the simultaneous reproduction error signal 76 shifts to High at T2' of the simultaneous reproduction signal 72 and an uncorrectable error has been detected there. In response to the simultaneous reproduction error information signal 76, the control circuit 16 produces the control signal 17 so as to close the recording gate 14 at the end of T3' of the record signal 13. The control circuit 16 shifts the memory control signal 82 to High to stop storage of the reproduced output signal 5 in the memory 80. The memory 80 must have the storage capacity capable of storing T2 and T3 of the output signal 5. This is because when the recording stops, the signal components corresponding to T2 and T3 have been already lost from the tape 1 and the signal components corresponding to T2' and T3' have been recorded on it so that the signal components corresponding to T2 and T3 must be held.

FIGS. 10A to 10H show timing relationships when retrial of the recording is performed. The signal components T0 to T3 in the reproduction signal 3 have been rewritten into T0' to T3' by the previous recording. T2' is a signal component containing some error. The output signal 77 reproduced precedingly will be outputted after a predetermined time delay from the reproduction signal 3. In response to the time code signal 40 and identification data signal 69, the control circuit 16 switches the switch 78 from the side T to the side M at the timing when T2' and T3' in the output signal 5 are outputted, thereby outputting the memory output signal 81 as the output signal 5. The record signal 13 processed by the processing circuit 8 shifts the control signal 17 to Low so as to initiate the recording at T2'. The control circuit 16 can create the operation timings of the control signals 17, 79 and 82 on the basis of the error position in the previous recording which can be known from the time code signal 40 and identification data signal 69.

Additionally, the condition of controlling opening/closing of the recording gate 14 during the recording may be set on the basis of the degree of difference in the data value between the digital input signal 9 and the simultaneous reproduction digital output signal 83.

We claim:

1. A read-before-write operation type system for recording and reproducing a digital video signal to or from a recording medium in the form of a recording tape, comprising:

a recording head and a reproducing head, said reproducing head being arranged to precede said recording head by a predetermined time with respect to said recording medium to enable reproduction of recorded video data before writing of the reproduced video data by such recording head;

medium driving means for driving said recording medium in the form of a tape;

reproducing means having said reproducing head, for reproducing video data recorded on said recording medium to be outputted as reproduced output video data and including an error detection and correction circuit for determining that a possible error contained in the reproduced output video data and detected from the reproduced output video data is not correctable by said error detection and correction circuit and for generating an error occurrence signal indicative thereof;

recording means having said recording head, for generating a record video data on the basis of input video data corresponding to the reproduced output video data from said reproducing head with a predetermined delay time during the reproducing operation, recording said record video data on said recording medium as a new data using said recording head and stopping the recording operation in response to a recording control signal; and control means for controlling said medium driving means and generating said recording control signal and supplying said recording control signal to said recording means in response to the error occurrence signal supplied from said reproducing means.

2. A system to claim 1, further comprising means for subjecting the output data from said reproducing means to a desired processing and supplying the processed data to said recording means as the input data.

3. A system according to claim 2, wherein said processing includes at least one of (1) a video signal processing changing a luminance gain, chrominance gain and hue of a picture representative of the output data, (2) a processing of synthesizing a signal of the output data with other signals, and (3) a video switcher processing between the output data signal and an external signal.

4. A system according to claim 1, wherein said recording medium contains a frame synchronization data recorded for each frame of the record data, and one frame of the data is composed of a plurality of data blocks each having an identification data for identifying the individual data block, and wherein said reproducing means further includes means for reproducing, the identification data corresponding to the data block to be reproduced from said recording medium during the reproducing operation, and supplying the reproduced identification data to said control means, and said control means further comprises means for reproducing, from said recording medium during the reproducing operation, the frame synchronization data representative of the frame to which the data block to be reproduced belongs, receiving the identification data reproduced by said reproducing means, and holding the reproduced frame synchronization data and the reproduced identification data in response to the error occurrence signal.

5. A system according to claim 4, wherein said control means further includes means for driving said medium driving means again to detect the data block corresponding to the held frame synchronization data and identification data.

6. A system according to claim 1, further comprising additional reproducing means having an auxiliary reproducing head, for reproducing the new record data from said recording medium by use of said auxiliary reproducing head, and generating a write error signal when a predetermined error state occurs during the operation of reproducing the new record data, and wherein said reproducing means includes:

storing means with a predetermined capacity for storing the newest reproduction data corresponding to the capacity and outputting the stored data in response to an input storage control signal;

selecting means for outputting one of the reproduced data and the data stored in said storage means in response to an input selection control signal; and said control means further comprises control signal generating means responsive to said write error signal for driving the said medium driving means again and generating and respectively supplying to said storage means and said selection means the storage control signal and the selection control signal.

7. A system according to claim 6, wherein said recording medium contains a frame synchronization data recorded for each frame of the record data, and one frame of the data is composed of a plurality of data blocks each having an identification data for identifying the individual data block, and wherein said reproducing means further includes means for reproducing, from said recording medium during the reproducing operation, the identification data corresponding to the data block to be reproduced, and supplying the reproduced identification data to said control means, and said control means further comprises means for reproducing, from said recording medium during the reproducing operation, the frame synchronization data representative of the frame to which the data block to be reproduced belongs, receiving the identification data reproduced by said reproducing means, and holding the reproduced frame synchronization data and the reproduced identification data in response to one of the error occurrence signal and the write error signal.

8. A system according to claim 7, wherein said control means includes means for detecting the data block corresponding to the held frame synchronization data and identification data when driving said medium driving means again in response to the write error signal and controlling said control signal generating means so as to supply the storage control signal and selection control signal to said storing means and said selecting means, respectively.

9. A system according to claim 6, further comprising means for subjecting the output data from said reproducing means to a desired processing and supplying the resultant data to said recording means as an input data.

10. A system according to claim 1, wherein said recording means records the new data in the same tape position as the reproduced output video data reproduced by said reproducing head.

11. A read-before-write operation type method for recording and reproducing a digital video signal to or from a recording medium in the form of a tape wherein a reproducing head is arranged to precede a recording head by a predetermined time with respect to said recording medium so as to enable reproduction of recorded video data before writing of the reproduced video data by said recording head, comprising the steps of:

driving said recording medium in the form of a tape;

reproducing a record video data from said recording medium with said reproducing head to provide reproduced output video data;

generating the record video data from the data corresponding to the reproduced output video data with a predetermined time delay during the reproducing operation and recording with said recording head the generated record video data on said recording medium as a new data;

generating an error occurrence signal in response to a determination that a possible error contained in the reproduced output video data and detected from the reproduced output video data is not correctable; and     inhibiting the recording operation in response to a recording control signal responsive to the error occurrence signal.

12. A method according to claim 11, further comprising the step of subjecting the output video data to a desired processing during the reproducing operation and outputting the processed video data as the data corresponding to the output video data.

13. A method according to claim 11, wherein said recording medium contains a frame synchronization data recorded for each frame of the record data, and one frame of the data is composed of a plurality of data blocks each having an identification data for identifying the individual data block, and wherein said reproducing step further comprises steps of:

reproducing, from said recording medium during the reproducing operation, the identification data corresponding to the data block to be reproduced; and reproducing, from said recording medium during the reproducing operation, the frame synchronization data representative of the frame to which the data block to be reproduced belongs, and said inhibiting step comprises the step of holding the reproduced frame synchronization data and the reproduced identification data in response to the error occurrence signal.

14. A method according to claim 13, further comprising the steps of driving said recording medium again to detect the data block corresponding to the held frame synchronization data and identification data.

15. A method according to claim 11, wherein said recording step further comprises the steps of:

reproducing the new record data from said recording medium immediately after the new record data has been recorded; and generating a write error signal when a predetermined error state occurs during the reproducing operation of the new data, and said reproducing step further comprises the step of:

reproducing the record data from said recording medium;

storing in a memory the newest reproduction data corresponding the capacity of the memory; and selecting, as the output data, one of the reproduction data and the stored data, and the stored data of the reproduction data and the stored data in response to the write error signal.

16. A method according to claim 15, wherein said recording medium contains a frame synchronization data recorded for each frame of the record data, and one frame of the data is composed of a plurality of data blocks each having an identification data for identifying the individual data block, and wherein said reproducing step further comprises steps of:

reproducing, from said recording medium during the reproducing operation, the identification data corresponding to the data block to be reproduced; and reproducing, from said recording medium during the reproducing operation, the frame synchronization data representative of the frame to which the data clock to be reproduced belongs; and holding the reproduced frame synchronization data and the reproduced identification data in response to one of the error occurrence signal and the write error signal.

17. A method according to claim 15, wherein said step of driving the recording medium comprises the step of detecting the data block corresponding to the held frame synchronization data and identification data when said recording medium is driven again.

18. A method according to claim 11, wherein said recording head records the generated record video data on said recording medium as new data in the same tape position as said reproducing head reproduces the record video data from said recording medium.

* * * * *